No. 750,876. PATENTED FEB. 2, 1904.
J. B. MERIAM & M. B. CRIST.
ELECTRIC PLANT FOR CHARGING STORAGE BATTERIES.
APPLICATION FILED JULY 25, 1902.
NO MODEL. 2 SHEETS—SHEET 1.

Witnesses.
E. B. Gilchrist
H. M. Weir

Inventors,
Joseph B. Meriam,
Mark Brown Crist,
By their Attorneys,
Thurston & Bates.

No. 750,876. PATENTED FEB. 2, 1904.
J. B. MERIAM & M. B. CRIST.
ELECTRIC PLANT FOR CHARGING STORAGE BATTERIES.
APPLICATION FILED JULY 25, 1902.
NO MODEL. 2 SHEETS—SHEET 2.
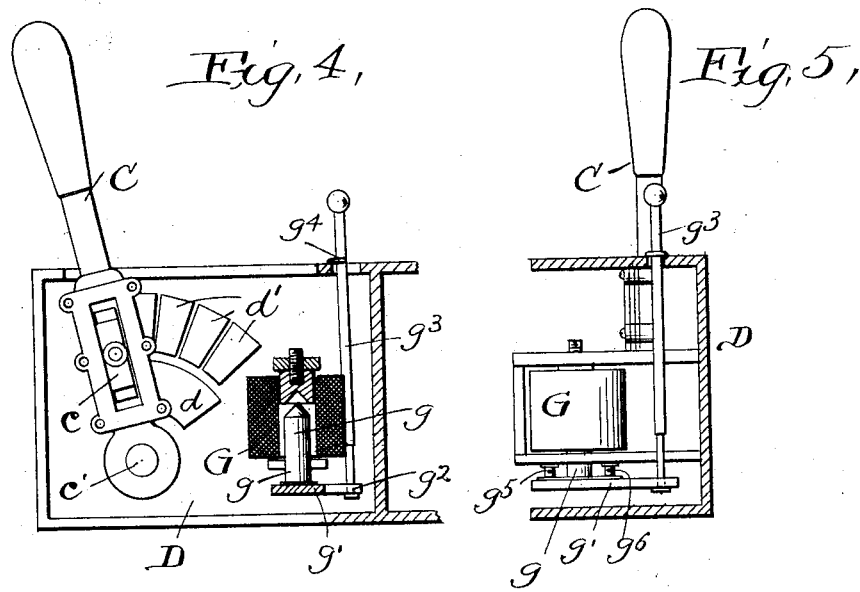
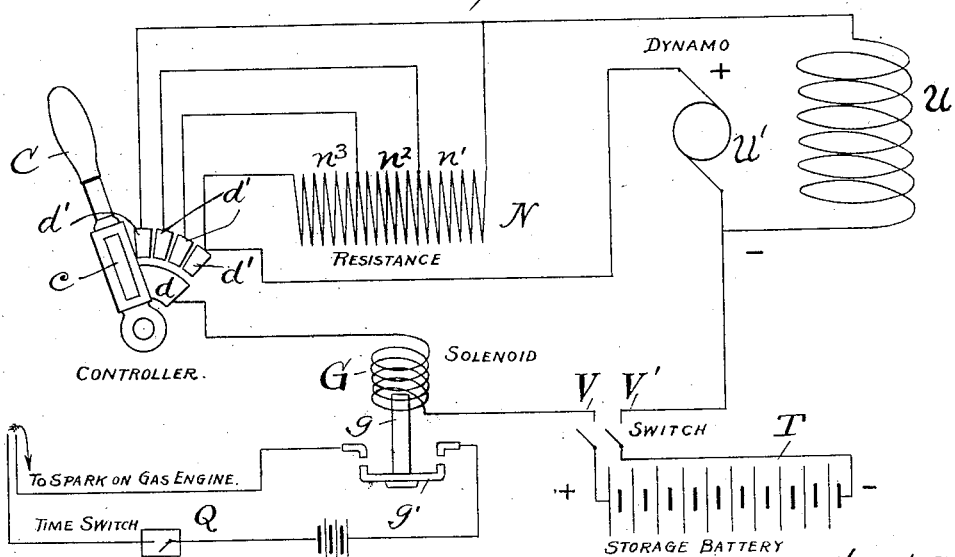

No. 750,876. Patented February 2, 1904.

UNITED STATES PATENT OFFICE.

JOSEPH B. MERIAM AND MARK BROWN CRIST, OF CLEVELAND, OHIO, ASSIGNORS TO THE MERIAM-ABBOTT COMPANY, OF CLEVELAND, OHIO, A CORPORATION OF OHIO.

ELECTRIC PLANT FOR CHARGING STORAGE BATTERIES.

SPECIFICATION forming part of Letters Patent No. 750,876, dated February 2, 1904.

Application filed July 25, 1902. Serial No. 116,936. (No model.)

*To all whom it may concern:*

Be it known that we, JOSEPH B. MERIAM and MARK BROWN CRIST, citizens of the United States, residing at Cleveland, in the county of Cuyahoga and State of Ohio, have invented a certain new and useful Improvement in an Electric Plant for Charging Storage Batteries, of which the following is a full, clear, and exact description, reference being had to the accompanying drawings.

Our invention relates to devices for charging storage batteries and certain mechanism for controlling the same, the object being to provide, in connection with an electric charging plant, (consisting of an engine and a shunt-wound dynamo driven thereby,) simple and efficient controlling means whereby a storage battery may be used conveniently by its residual current to start the engine and the latter after it is started recharge the battery, our invention providing for automatically shutting off the engine when the battery is fully charged.

Our invention also provides means whereby if the circuit in any part of the line becomes broken the engine is shut off.

Our invention is particularly designed for use in connection with motor-vehicles and electric launches operated by storage batteries. By means of a cord and plug the battery is connected with the charging plant and the engine started by the residual current in the battery acting upon the dynamo as a motor. Our controlling mechanism requires the operator to hold his hand on the switch until the engine has fully started and everything is running properly, after which he can let the charging plant alone and it will automatically throw itself out either when the battery is fully charged or when any break of any sort occurs or, if desired, after a certain definite period by the employment of a time-switch.

The particular embodiment of our controlling mechanism herein shown is also of our invention and will now be particularly described.

Figure 1:
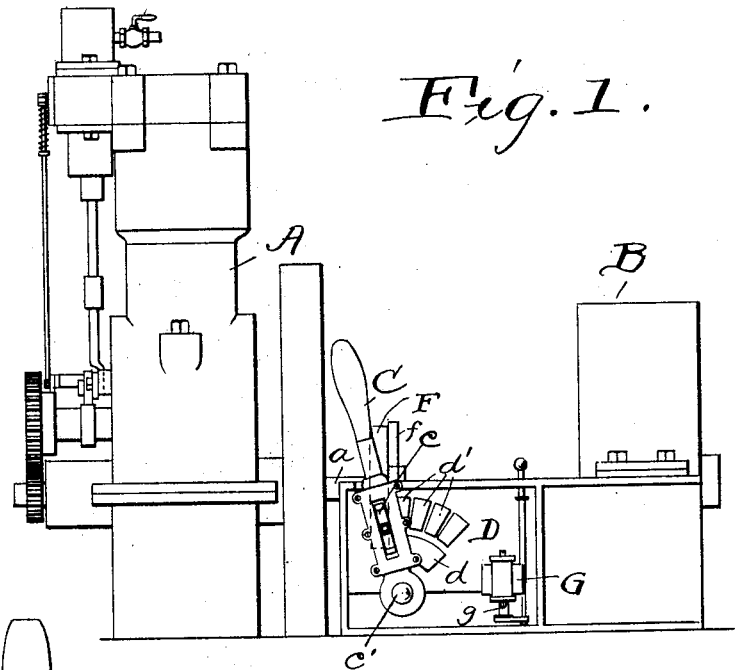
Figure 2:
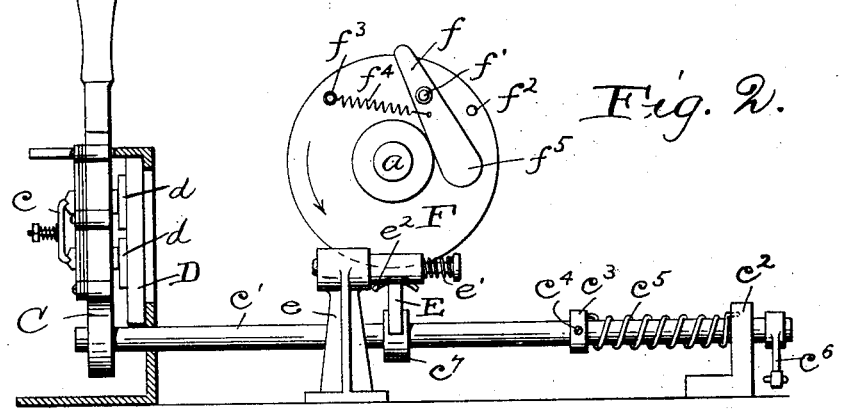
Figure 3:
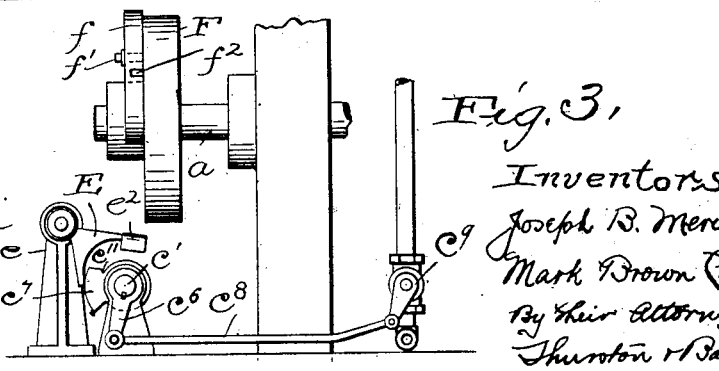

Referring to the drawings, Figure 1 is an elevation of a plant constructed along the lines of our invention. Fig. 2 is a side elevation of the switch-lever and the controlling mechanism. Fig. 3 is an end view of the mechanism of Fig. 2, showing the gas-cock-operating mechanism. Fig. 4 represents the starting mechanism, showing the solenoid in cross-section. Fig. 5 is an end view of the same, and Fig. 6 is a diagrammatical view showing the parts in their respective relation and the winding of the dynamo.

Referring to the parts by letters, A represents a gas-engine of any suitable construction in direct connection with the shunt-wound dynamo B, which is controlled by the switch-lever C, having a contact-piece $c$ carried thereby. Upon the framework D are mounted contact-plates $d$ and $d'$.

The lever C is mounted upon the end of a shaft $c'$, which projects from the frame D and is supported at the rear end in a suitable bearing $c^2$. Rigidly mounted upon this shaft $c'$ is a collar $c^3$, rigidly carrying one end of a coiled spring $c^5$. The other end of this spring is secured in the bearing $c^2$, and its tendency is to rotate the shaft $c'$ in a direction which will keep the switch-lever C off of the contact-pieces which close the circuit. A small arm $c^6$ is keyed to the shaft $c'$ in such a position that it can conveniently operate the cut-off valve $c^9$ in the gas-supply pipe through the link $c^8$.

A latch-cam $c^7$, having a notch $c''$, is mounted upon the shaft $c'$, and adjacent to this shaft $c'$ and in a position such that it may operate in connection to said latch-cam $c^7$ is a latch E, which is mounted upon a suitable bracket $e$, secured to the framework. This latch is of the form shown and is preferably provided with a coiled spring $e'$ for retaining it in contact with the notch $c''$ of the latch-cam $c^7$. It is also provided with a trip-shoe $e^2$.

Upon the engine-shaft $a$ is secured a disk F, having mounted thereto a centrifugal dog $f$, (carried by a pin $f'$,) a stop-pin $f^2$, and a stud $f^3$, to which latter is fastened one end of a coiled spring $f^4$, having its other end fastened to the dog in such a manner that one end of the dog tends to project beyond the periphery of the disk F. When the shaft is rapidly rotated, however, the weighted end $f^5$ of the dog will be thrown out by centrifugal force against the tension of the spring $f^4$, moving the other end into an idle position. The disk F, with its dog $f$, is arranged upon the engine-shaft, so that the dog when active—that is, during slow rotation of the shaft—may operate upon the shoe $e^2$ of the latch E and knock the latch from engagement with the notch $c''$ of the latch-cam $c^7$.

By the above-described means whenever the speed of the engine diminishes below a predetermined minimum, caused by a hot box or any other accident which would increase the load upon the engine and reduce its speed, the supply of gas to the engine is automatically shut off and the engine stops, the circuit between the generator and the batteries being broken also. The shaft may also be slowed down either by the breaking of the sparking circuit caused by the solenoid-governing device, hereinafter described, or else by a lack of fuel, both of which occurrences will likewise cause a breaking of the circuit from the generator to the batteries through the instrumentality of the mechanical governor just described.

Upon the frame D is also secured a solenoid which controls the circuit for sparking the engine. This solenoid is of a well-known construction, consisting of a helix G and the core $g$, to which is connected the switch-bar $g'$ for the sparking circuit. An operating-rod $g^3$, loosely connected at its lower end with the bar $g'$, is mounted in a suitable opening in the frame and has a retaining-lug $g^4$ formed on it and adapted to engage above the top of the frame and hold the switch-bar $g'$ in contact with the contact-pieces $g^5$ $g^6$.

It will be seen that when the lug $g^4$ is released from above the frame and allowed to pass down through the frame the switch-bar of the solenoid, unless the solenoid is energized, will be allowed to drop and break the circuit. The operating-rod $g^3$ is arranged in the frame so that it may lie in the path of the switch-lever C, and the lug $g^4$ is in such position on said rod $g^3$ that it will hold it, with the bar $g'$, bridging the contacts $g^5$ $g^6$, until the switch-lever C knocks the lug out of engagement with the frame and releases the core of the solenoid. When thus released, if the current is flowing through the solenoid it will retain the bar $g'$ bridging the contacts. This solenoid mechanism is the "underload-governor." It requires a certain amount of current to be flowing, and if the current should go below that minimum from the breaking of the connection to the battery or from any other cause the solenoid will drop the bar $g'$, the sparking circuit will be broken, and the speed of the engine will decrease until the dog $f$ engages the latch E and shuts off the gas.

The diagram illustrates a convenient winding of the dynamo and connections to the switch. U represents the field, and U' the armature. Suitable resistance N is used in starting the machine, being in the armature-circuit at the start and being gradually cut out of the armature-circuit into the field-circuit by the movement of the lever C. Thus if this lever is moved into the positions bridging from the common contact-piece $d$ to the individual pieces $d'$ successively the circuit is first connected with all of the resistance in the armature-circuit and then with the portions $n'$, $n^2$, and $n^3$ successively cut out of the armature-circuit and into the field-circuit. This provides for a gradual starting of the machine when the lever is shifted to the right. The current in passing from the storage battery is taken through the solenoid G, which thus retains its core $g$ elevated, with the bridge-piece $g'$ completing the sparking circuit to the engine. If desired, a time-switch Q of ordinary construction may be included in the sparking circuit, the operation of this switch being to open the circuit when a certain predetermined time arrives. Such an arrangement is of advantage in case it should be desired to only partially charge the storage battery.

When the device is used in connection with a motor-vehicle having storage batteries, current is supplied from the storage batteries to the wires V V'. The bar $g^3$ is lifted by hand, so that the lug $g^4$ will rest upon the frame, as shown in Fig. 4, when the circuit through the sparking device will be completed. The lever C is then slowly moved to the right, starting the dynamo as a motor at low speed, thus rotating the engine-shaft and giving the proper compression in the cylinder. The lever is then switched farther upon the plates $d'$ until as the engine has gotten under way it comes onto the last plate, when the rod $g^3$ will be engaged by the lever C and the lug $g^4$ knocked out of engagement with the frame and the rod permitted to descend, releasing the bridge-bar $g'$ and leaving it held up by the solenoid only.

It is necessary for the operator to hold his hand upon the lever C until the dynamo has speeded up the engine sufficiently for it to take care of itself, for though the latch-cam $c^7$ will have passed beneath the latch E and engaged it the projecting end of the dog $f$ if the speed were not sufficient would release the latch, and the lever C would return to its original position under the influence of the spring $c^5$ unless held by hand. When the speed is sufficient, however, the weight end of the dog $f$ will be thereby thrown out by centrifugal force against the pin $f^2$, thus moving to an inoperative position in the other end of the dog and permitting it to pass idly over the trip-shoe $e^2$, whereby the latch will retain the lever C in its extreme operative position.

Since the shaft $c'$, upon which the latch-cam is mounted, has the arm $c^6$ at the other end in connection with the gas-cock, gas will be admitted to the engine in proportion to the amount that the lever C has been operated. The device is then in full operation and the engine is operating the dynamo and recharging the battery T.

Should a short circuit occur in the line at a point which would reduce the current in the solenoid or should the carriage containing the storage battery accidentally be removed, the circuit will consequently be broken through the solenoid, thus allowing the core to drop and breaking the circuit through the sparker of the engine. This, it will be seen, will necessarily slacken down the speed of the engine, and this reduction in speed will permit the spring $f^4$ to draw the dog $f$ into an active position, where it engages and then causes the gas-supply to be cut off from the engine, as already explained.

When the batteries are completely charged, or, in fact, while the batteries are becoming charged, a counter electromotive force will be set up in the batteries, which will gradually neutralize the current passing from the generator to the batteries and will finally reduce it to an extent below the point at which the solenoid is wound, which will of course energize the same, causing it to drop its core, which operation breaks the sparking circuit to the engine. The breaking of the sparking circuit necessarily slows down the engine, and the slowing down of the engine causes the centrifugal governor or controller to cut off the gas-supply to the engine and also break the main circuit from the batteries to the generator.

Having described our invention, we claim—

1. In an electric plant, the combination, with an engine, of a dynamo connected with said engine, and a mechanical speed-governor for stopping the engine whenever its speed decreases below a predetermined minimum, substantially as described.

2. In an electric plant, the combination, with a gas-engine, of a dynamo connected with said engine, said dynamo being arranged to operate as a motor, and a centrifugal speed-governor for stopping the engine whenever its speed decreases below a predetermined minimum, substantially as described.

3. In an electric plant, the combination, with a gas-engine, of a dynamo adapted to be operated as a motor for starting said engine, a starting-switch for said dynamo when operated as a motor, devices in connection with said switch for cutting off the gas-supply when the engine is overloaded, and means whereby the sparking circuit may be broken when the current falls below a certain predetermined minimum, substantially as described.

4. In an electric plant, the combination, with a gas-engine, of a dynamo in connection with said engine and adapted to operate as a motor, a switch for starting said dynamo as a motor, connections between said switch and the valve of said engine, a centrifugal operating-dog in connection with said engine for shutting off said switch and said valve when the engine speed is less than a predetermined minimum, substantially as described.

5. In an electric charging plant, for storage batteries, the combination of a gas-engine, a dynamo adapted to be operated as a motor for starting said engine, a sparking circuit for said engine, an electromagnetic switch controlling said circuit, said switch having its coil in the main circuit of the dynamo and storage battery and operating to open the sparking circuit if the main circuit is broken, substantially as described.

6. In an electric plant, the combination, with a gas-engine, of a dynamo adapted to be operated as a motor, a storage battery adapted to operate said motor and start said engine and to be charged after said engine is under way, a switch for starting the dynamo as a motor, means for maintaining the sparking circuit closed while starting the engine, devices in connection with the engine-shaft and said switch, whereby said switch may be thrown and the gas for said engine cut off when said engine is operating at an overload, and means for breaking the sparking circuit when it is operating at an underload, substantially as described.

7. In an electric plant, the combination with a gas-engine of a dynamo adapted to be operated as a motor, a switch for starting the same, connections between said switch and the gas-supply for said engine, means for operating said switch to cut off the current and the gas-supply when the engine is working at an overload, means for holding the sparking circuit closed during the starting of the engine, and means for electrically retaining said sparking circuit closed after the engine is under way, substantially as described.

8. In an electric plant, the combination of a gas-engine, a dynamo adapted to be operated as a motor for starting the engine, a switch for controlling the starting of the motor, connection between said switch and the valve of the engine, a latching device tending to hold said switch in an operative position and said valve open, and a centrifugal dog operated by the engine and adapted to release said latching device, substantially as described.

9. In an electric plant, the combination, with a gas-engine, of a dynamo operating in connection therewith, said dynamo being adapted to operate as a motor, a switch adapted to control the starting of the dynamo, a shaft carrying said switch and provided with means for normally retaining the same in an off position, connections between said shaft and the gas-valve leading to said engine, a latch-cam provided upon said shaft, a latch adapted to operate in connection with said latch-cam, and a centrifugal dog rotated by the engine-shaft for disengaging said latch from said latch-cam, substantially as described.

10. In an electric plant, the combination of a gas-engine, a dynamo adapted to be operated as a motor, a switch for controlling the starting of the motor, a shaft connected with said switch, a latch-cam secured to said shaft, a spring normally retaining said switch in an off position, connections between said switch-shaft and the valve of the engine, a latch operating upon said latch-cam, a dog mounted upon the engine-shaft adapted to trip said latch and release said switch when the engine is operating at an overload, substantially as described.

11. In an electric plant, the combination with a gas-engine, of a dynamo connected therewith, a switch for controlling the starting of the dynamo, a shaft carrying said switch, a spring tending to retain said switch in an off position, a connection between said shaft and the engine-valve, a latch-cam mounted upon said shaft, a latch operating in connection with said cam and adapted to hold the switch in an extreme position, a trip-shoe upon said latch, a disk upon the engine-shaft, and a dog pivoted to said disk and adapted to engage the said trip-shoe when the engine is at low speed, substantially as described.

12. In an electric plant for charging storage batteries, the combination of a gas-engine, a dynamo adapted to be operated as a motor, a switch for controlling the starting of the motor, a connection between said switch and the valve of the engine, a latching device for holding said valve and said switch in operative positions, a centrifugal dog adapted to trip said latching device when the engine is operating at an overload, a switch for completing the sparking circuit, means for retaining said last-mentioned switch in a position to complete the circuit while the engine is starting, and a solenoid in connection therewith for retaining the circuit closed while the dynamo is charging the batteries, substantially as described.

13. In an electric plant for charging storage batteries of motor-vehicles, the combination of a dynamo, mechanism for operating said dynamo to charge said batteries, a mechanical governor for stopping said mechanism and for breaking the main circuit to said dynamo, an electrical device in the main circuit provided with means whereby it may slow down said dynamo-operating means and thereby operate said mechanical governor when the counter electromotive force of the batteries reduces the current to a predetermined minimum, substantially as described.

14. In an electric plant for charging storage batteries, the combination of an engine, a dynamo adapted to be operated by said engine, a mechanical governor for said engine adapted to stop the same and break the main circuit to said batteries when running at less than a predetermined speed, and an electrical governor arranged to slacken the speed of said engine and thereby operate said mechanical governor when the counter electromotive force of the batteries sufficiently reduces the current, substantially as described.

15. In an electric plant for charging storage batteries, the combination of a gas-engine, a dynamo adapted to be operated by said engine, a mechanical governor in connection with said engine for cutting off the fuel of said engine and breaking the main circuit to said batteries when running at less than a predetermined speed, and an electrical governor adapted to slow down the speed of said engine and thereby operate said mechanical governor when the counter electromotive force of the batteries sufficiently reduces the flow of current to said electrical device, substantially as described.

16. In an electric plant for charging storage batteries, the combination of a gas-engine, a dynamo adapted to be operated by said engine, a valve for controlling said engine, a mechanical governor connected with said valve and with the circuit to said batteries whereby when the speed of said engine drops below a predetermined point, said governor will close the valve of said engine and break said circuit, a solenoid in the main circuit provided with means whereby it will drop its core and break the sparking circuit to the engine and also the main circuit when the voltage in the main line reaches a predetermined minimum caused by the counter electromotive force in the battery, substantially as described.

In testimony whereof we hereunto affix our signatures in the presence of two witnesses.

JOSEPH B. MERIAM.
MARK BROWN CRIST.

Witnesses:
ALBERT H. BATES,
H. M. WISE.